United States Patent

[11] 3,596,449

| [72] | Inventor | Edward William Rowland-Hill<br>New Holland, Pa. |
|---|---|---|
| [21] | Appl. No. | 828,894 |
| [22] | Filed | May 29, 1969 |
| [45] | Patented | Aug. 3, 1971 |
| [73] | Assignee | Sperry Rand Corporation<br>New Holland, Pa. |
| [32] | Priority | Sept. 13, 1968 |
| [33] | | Belgium |
| [31] | | 48,293 |

[54] COMBINE WITH MEANS FOR ADDING A PRESERVATIVE TO HARVESTED GRAIN
17 Claims, 9 Drawing Figs.

[52] U.S. Cl. ................................................. 56/124
[51] Int. Cl. ............................................... A01d 41/12
[50] Field of Search ........................................ 56/1, 21, 19—20, 10, 124

[56] References Cited
UNITED STATES PATENTS
1,191,980  7/1916  Mason.......................... 56/1 X 2,157,619  5/1939  McElwain ..................  56/1
2,706,371  4/1955  Bishop..........................  56/20
2,716,317  8/1955  McClellan.....................  56/1

Primary Examiner—Louis G. Mancene
Assistant Examiner—Jay N. Eskovitz
Attorneys—Joseph A. Brown, John C. Thompson, James J. Kennedy and George C. Bower ABSTRACT: A combine has a grain storage tank with an upwardly inclined grain discharge pipe containing a screw conveyor. A preservative applicator is mounted on the grain discharge for delivery of propionic acid to grain passing into the discharge conveyor to preserve moisture-containing grain in storage. In one form the applicator is positioned at the intake of the discharge pipe and contains the screw conveyor. The propionic acid discharge in the applicator is connected through a pump and control valve to a tank storing propionic acid. In another form the screw conveyor adjacent the pipe discharge has jets connected to an inner pipe concentric to the tubular shaft of the screw.

PATENTED AUG 3 1971
3,596,449
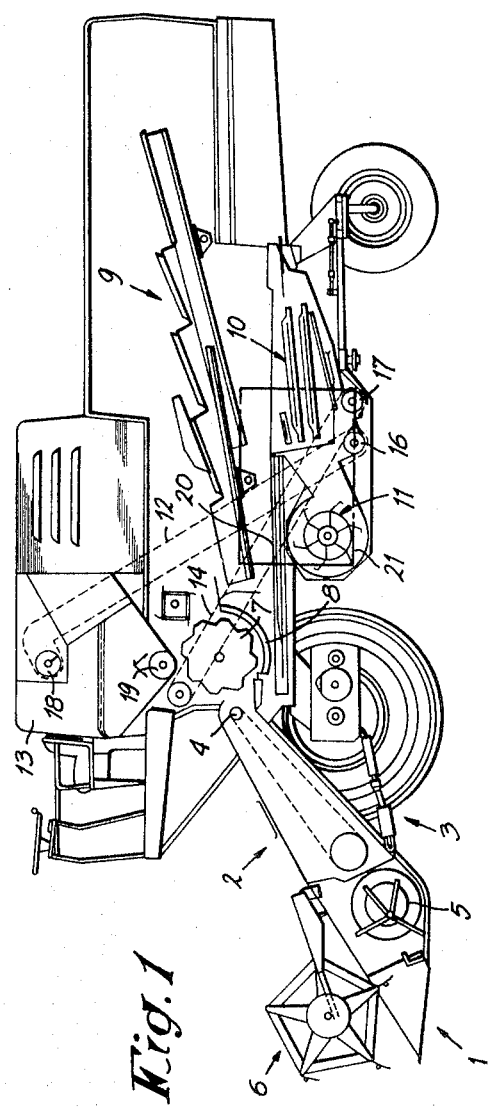
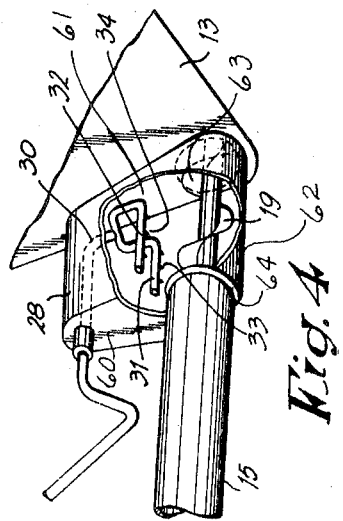
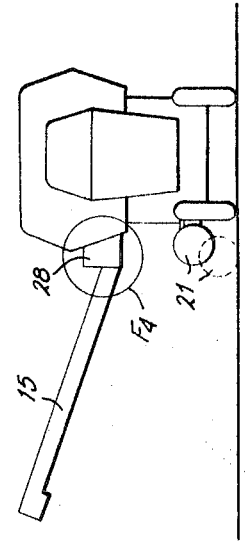
INVENTOR.
EDWARD WILLIAM ROWLAND-HILL
BY
George A Bower
ATTORNEY

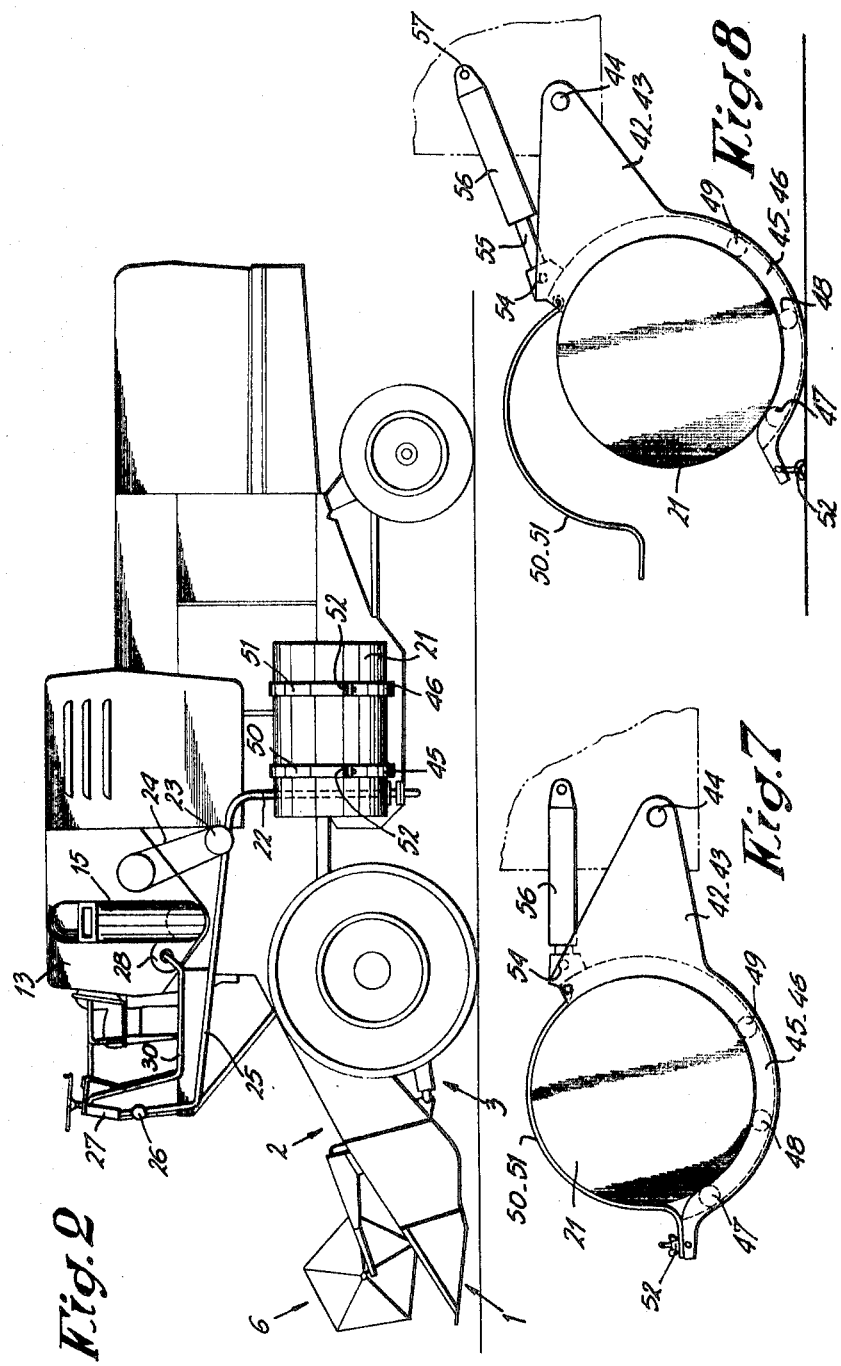

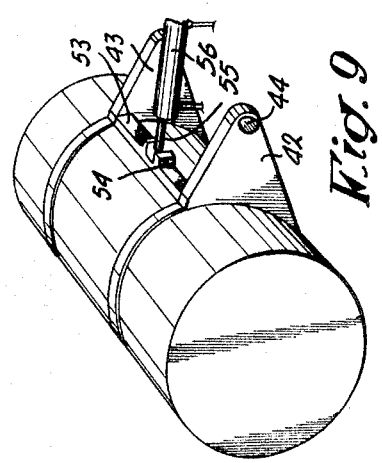
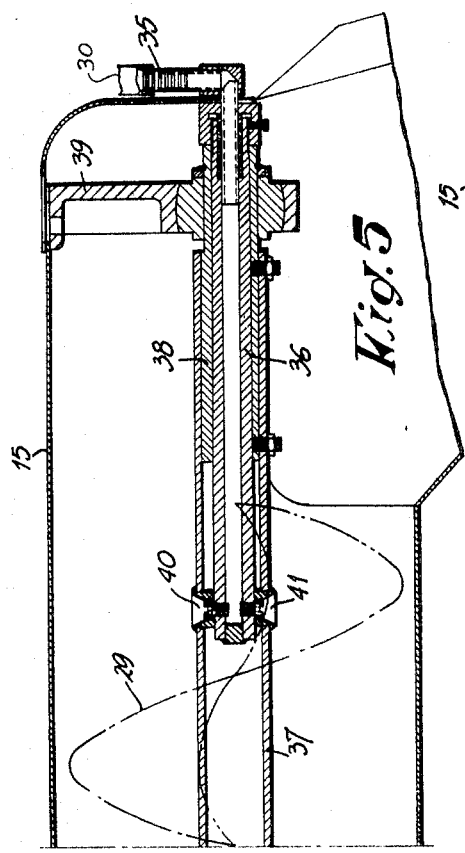
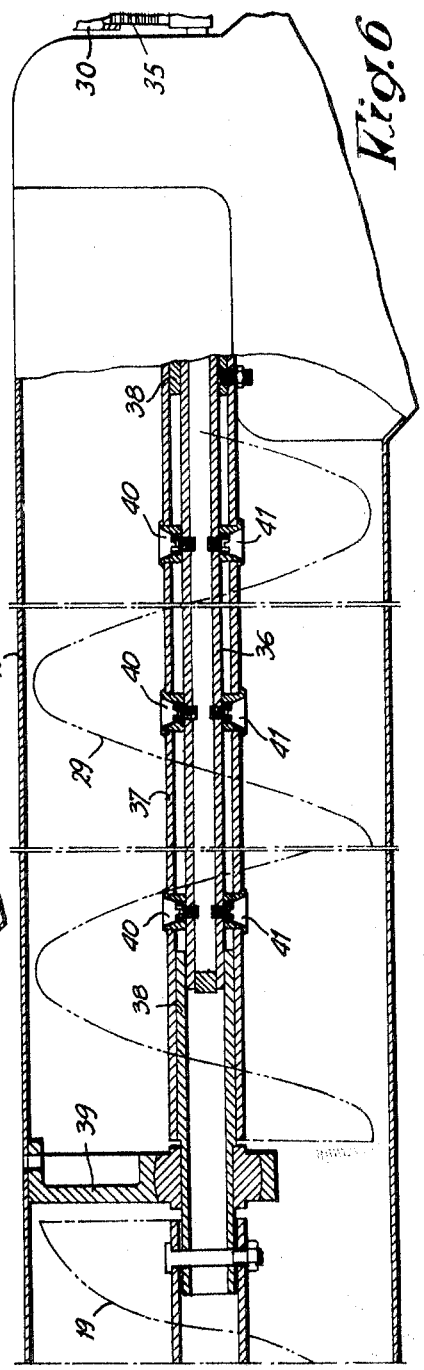
INVENTOR.
EDWARD WILLIAM ROWLAND-HILL
ATTORNEY

COMBINE WITH MEANS FOR ADDING A PRESERVATIVE TO HARVESTED GRAIN

BACKGROUND OF THE INVENTION

This invention relates to harvesting and storing of crops to prevent destruction of the crops while stored and is directed particularly to means for adding propionic acid to the harvested and separated crop.

It is well established that the various grains should have a moisture content below a given percent for a given grain to permit longer storage and shipment of grain without substantial grain damage by mold and germination. Often grain is harvested with a moisture content in excess of the allowable percentage and it is necessary to dry the grain.

Grain containing excessive moisture may be dried in many ways. Mobile driers may be moved from field to field and the grain dried as it is harvested. Stationary driers may be provided and the moist grain transported from the fields to the driers. These stationary driers may be adjacent storage facilities or the drier grain may be transported to distant silos and grain elevators. These methods have the disadvantage of capital investment in driers, cost of labor to operate the equipment and increased likelihood of grain loss and damage due to handling and conveying of grain. Another shortcoming is the lack of capacity of the driers to handle the large quantity of harvested grain.

Another factor is grain crackage or damage. When the outer sheath or coat of grain is cracked the inner kernel is more accessible to damaging bacteria. This shortens the storage life of grain. In driers the grain must be carefully and properly processed as to temperatures, length and rapidity of heating and length and rapidity of cooling. If proper procedures are not followed the grain may be cracked by too rapid heating or cooling or by improper temperatures applied for incorrect periods of time.

Also, there is an incompatibility between the dryness of stored grain and the desired moisture content for grain handling. Stored wheat should have a moisture content of 13 percent or less. However, conveyed wheat should have a moisture content of 14 percent or more to reduce cracking of the wheat. Cracked wheat exposes the inner kernel to bacteria thereby increasing the loss of grain by mold and shortening the storage time of the grain.

The harvesting of dried wheat has, not only, the disadvantage of the handling grain with a moisture content of less than 13 percent. It also has the disadvantage that standing dried wheat may contain cracks before harvesting. Thus the what is initially subject to damage before it is touched by machinery. Other grains such as corn have a different percent moisture content for storing and handling.

Recently the treatment of grain with a preservative has been given favorable consideration. The harvested grain is transported to special treating tanks and then to storage facilities. The liquid preservative prevents bacteria from developing and the grain from germinating. The preferred preservative is liquid propionic acid. Other preservatives may be used. A proportion of approximately 1 percent of propionic acid kills mold bacteria and sterilizes the seed. Propionic acid is nontoxic and not harmful, if consumed by livestock in limited quantities. By many it is considered to be beneficial. A very acceptable animal feed is formed. Although this method permits the handling of grain at an acceptable moisture level the present equipment has the drawback of a large capital investment, expense of operation and the possibility of lack of capacity to handle the output of the harvesting machines.

It is, therefore, desirable to provide means for treatment with a preservative of high-moisture-containing grain that does not require a large capital outlay, is not costly to operate and treats grain as it is harvested.

OBJECTS AND SUMMARY OF THE INVENTION

An object of this invention is to provide means on an agricultural machine for treating grain at the rate of harvesting with a preservative that prevents damage in storage.

Another object of this invention is to provide on a combine a liquid preservative applicator that treats the grain as it is being discharged from the combine.

Another object of this invention is to provide on a combine a liquid preservative applicator that is inexpensive to make and install.

Another object of this invention is to provide on a combine a liquid preservative applicator that is controlled by the combine operator.

Another object of the invention is to provide preservative treatment of grain carried by a combine without requiring additional labor for the operation of the liquid preservative applicator.

In summary, a preservative applicator is mounted on an agricultural machine to add liquid preservative to conveyed grain at the rate of harvesting of the grain.

Other and further objects and advantages will be apparent from the following description and claims taken in connection with the accompanying drawing which illustrates the various features of this invention.

BRIEF DESCRIPTION OF THE DRAWINGS

FIG. 1 is a diagrammatic side view of a combine with the side removed to illustrate the main threshing and separating components;

FIG. 2 is a side view of the combine according to FIG. 1 in which the principal elements of the present invention have been shown in solid lines;

FIG. 3 is a rear diagrammatic view of the combine according to FIGS. 1 and 2;

FIG. 4 is a fragmentary perspective view of the liquid preservative applicator on the combine;

FIG. 5 is a fragmentary longitudinal section of another embodiment of the intake end of the discharge pipe;

FIG. 6 is a fragmentary longitudinal section view of the embodiment of FIG. 5;

FIG. 7 is an end view of the liquid preservation tank in operation position on the combine;

FIG. 8 is a view similar to FIG. 7, illustrating the replacement of the tank; and FIG. 9 is a perspective diagrammatic view of the liquid tank with fastening elements.

DESCRIPTION OF PREFERRED EMBODIMENT

A conventional combine is shown in FIGS. 1 and 2 of the drawings and has a header 1 with a reel 6 and a channel conveying auger 5 feeding cut crops to the straw elevator 2. The header and elevator are raised and lowered by the hydraulic jacks 3 about the pivots 4. The cut crops are threshed by the cylinder 7 carrying the crops across the concaves 8 and discharging the remaining crop material on the shaker 9. The grain on the shaker 9 and grain pan 20 passes through the sieves 10 with the tailings conveyed to the front by the tailings elevator 14 received from the conveying auger 17. The clean grain is lifted by the grain elevator 12 received from the conveying auger 16 to the distributing conveying auger 18 in the grain tank 13. A conveying auger 19 is provided along the bottom for delivery of the grain to the discharge pipe 15 extending at an upward angle from the side of the combine.

In FIGS. 2 to 4, a liquid container or tank 21 is suitably fastened on the combine, connected by a conduit 22 to pump 23. The pump may be driven through a suitable belt 24 from the combine drive system. Pump 23 is further connected by a conduit 25 to a control valve 26 and a flowmeter 27 at the operator's controls so that the combine operator may control the liquid supply and, if required, adjust the flow rate thereof.

A casing 28 is mounted on the side of the grain tank 13 and, on one side, connected to the grain discharge. The discharge pipe 15 extends from the other side of the casing. The auger 19 extends through the pipe 15 and the casing 28 to the tank. The casing has spaced end walls 60,61 with a bottom and sidewall 62 therebetween for holding grain. The end walls have axially aligned openings 63,64, respectively, with opening 63 connected to the tank and the opening 64 connected to the discharge pipe. The auger 19 extends through the openings.

In the casing 28 shown in FIG. 4, conduit 30 has a portion bent in the direction of the conveying auger 19 with branches 31,32, respectively, extending parallel to the auger 19. The branches have holes and/or jets 33,34, respectively, for spraying liquid towards the auger.

The harvested grain is discharged through the pipe 15 by the conveying auger 19. The pump 23 is driven drawing propionic acid through conduits 22,25,20,30 from container or tank 21. The liquid is sprayed by jets 33,34 on the grain as it is moved through the casing 28 by the conveying auger 19 to the discharge pipe 15. The flow rate of the propionic acid is adjusted by the control valve 26, whereas the flow rate itself may be controlled by means of the flowmeter 27.

During the discharging operation, the flow rate of the grain in the discharge pipe and the flow rate of propionic acid is kept relatively constant. The grain receives a very regular sprinkling evenly distributing the acid for promoting very favorably the preservation process throughout the discharged grain.

FIGS. 5 and 6 show modifications in which the conduit 30 is fastened to the connector 35 on the free end of the discharge pipe 15. The connector 35 rotatably interfits a pipe 36 supported in the rotatable central tubular shaft 37 of the discharging conveyor auger. The discharging conveyor auger is mounted to rotate freely by means of an intermediate interior cylindrical part 38 in a suitable bearing means 39. In the case of the embodiment of FIG. 5 the shaft 37 and shaft 36 have two jets 40 and 41 respectively. The jets spraying propionic acid into the discharge pipe 15 from the bore of shaft 36 mix the acid with the grain. The liquid propionic acid is delivered to the bore by the connector 35.

The embodiment shown in FIG. 6 is substantially identical to the embodiment of FIG. 5. The jets 40,41 are provided at several longitudinally spaced locations.

Preferably, the liquid tank 21 is supported by a suspension (FIGS. 6, 7 & 8) upon the side of the combine in such manner that the replacement of an empty liquid tank 21 by a full tank may be effected very readily.

The suspension comprises two brackets 42 and 43, respectively, which are pivotally mounted by the stub shafts 44 on the reaper-thresher or combine. The brackets 42 and 43 have rigid semicylindrical beams 45 and 46, respectively, formed as a part thereof, the partially circular beams 45–46 each have three rotating rollers 47,48 and 49, respectively. The tank 21 can be rotated in the desired position in beams 45 and 46 from a transport position to a refuel position. Strips 50 and 51 are semicircular and clamped about container or tank 21 by tightening screws 52 to grip the tank between strips 45 and 50 on one hand, and 46 and 51 on the other hand.

Finally, the brackets 42 and 43 are interconnected through a longitudinal crossbar 53 (FIG. 9) which, has two brackets 54 normal thereto and intermediate the brackets 42,43. The end of a piston rod 55 of a hydraulic or pneumatic jack 56 is pivotally connected to the brackets 54. At its rear end, the jack is pivotally connected by pins 57 to the combine.

Thus, through a suitable control of the hydraulic or pneumatic jack 56, the tank may be set into operating position, as indicated, in FIGS. 2 and 7 or into a position facilitating the replacement of tank 21, as indicated in FIG. 8. In that position, the tank and the brackets 42,43 are laid upon the ground by means of the hydraulic or pneumatic jack 56.

It is thus seen that the grain as it is conveyed from the tank by the auger conveyor past the jets 33,34 on the branches 31,32 or, just prior to discharge, past the jets 41,42 in the pipes 36,37 a substantially uniform distribution of propionic acid in the grain is attained. The propionic acid is absorbed by the granules of grain and prevents the formation of destructive mold by bacteria. The acid also sterilizes the grain so that it cannot germinate. Wheat, for example, can then be stored with a moisture content in the order of 40 percent without deterioration of the wheat.

With the treating apparatus on the discharge conveyor the grain is processed as fast as it is harvested. Further, additional personnel is not required to operate the treating equipment. The treatment occurs automatically and is under the control of the combine operator. The storage tank of propionic acid is mounted on the lower side of the combine and the supports 45,46 are swung to rest on the ground for easy loading and unloading of the drums of acid and have rollers 47,48,49 for setting the outlet of the drum to the connection of pipe 22. Thus the storage tank can be easily replaced.

The apparatus providing the treatment is relatively simple and inexpensive so that a large capital outlay is not required.

Although propionic acid has been described in connection with the operation of the embodiments, other treating liquids may be used.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I CLAIM IS:

1. On a combine having a grain storage tank and grain-conveying means on said tank with a grain-receiving end for removing grain from said tank and a grain discharge end; a grain-preservative-treating means mounted on the combine and having discharge means connected to said grain-conveying means for adding preservative to grain being transported by said conveying means and for mixing preservative with the transported grain.

2. On a combine as set forth in claim 1 wherein said discharge means is at the grain-receiving end of said grain-conveying means.

3. On a combine as set forth in claim 1 wherein said discharge means is at the grain discharge end of said grain-conveying means.

4. On a combine as set forth in claim 2 wherein said grain-conveying means comprises a tubular member and a grain transport means extending through said tubular member and said discharge means is positioned exteriorly from said grain transport means for delivery of preservative to grain moved by said transport means.

5. On a combine as set forth in claim 4 wherein said grain-preservative-treating means comprises a casing between said tubular member and said tank with said grain transport means and said preservative discharge means within said casing.

6. On a combine as set forth in claim 5 wherein said casing is attached to said tank and said grain transport means extends to said tank for receiving grain therefrom.

7. On a combine as set forth in claim 4 wherein said grain-preservative-treating means includes a liquid preservative storage container, means for supporting said liquid preservative storage container on said combine and conduit means extending therefrom to said preservative discharge means.

8. On a combine as set forth in claim 7 wherein said combine has an operator's section and conduit means has control means at said operator's section for adjusting the flow of preservative.

9. On a combine as set forth in claim 3 wherein said conveying means has an axially extending shaft with an axially extending bore and said grain-preservative-treating means comprises nozzle means in said shaft extending exteriorly from within said bore and means for delivering preservative through said bore to said nozzle means for supplying preservative to grain moved by said conveying means.

10. On a combine as set forth in claim 9 wherein said means for delivering preservative within said bore comprises a pipe fitting concentrically to said shaft within said bore and having a second bore, said nozzle means extending to said second bore for receiving preservative.

11. On a combine as set forth in claim 7 wherein said liquid preservative container has two supports pivotally mounted on said combine to move said container between a lower position and an operating position and means for moving said support between said positions.

12. On a combine as set forth in claim 11 wherein said two supports and said support-moving means have a ground position for receiving and removing a container.

13. On a combine having grain storage means temporarily storing grain as harvested and means for conveying grain in a grain transfer relation with said storage means; a preservative applicator mounted on said combine having preservative discharge means positioned along said grain conveying means to spray and mix preservative with grain transported by said conveying means.

14. On a combine as set forth in claim 13 wherein said preservative applicator contains liquid preservative and has spray means spaced above said grain-conveying means for spraying liquid preservative on moving grain transported by said conveying means.

15. On a combine machine as set forth in claim 14 wherein said grain-conveying means is of the auger type.

16. A combine comprising means for harvesting, threshing and separating grain, means for storing grain separated from said harvesting threshing and separating means, means for removing grain from said storing means, a grain-preservative-treating means on said combine having discharge means connected to said grain-removing means for applying a preservative to grain transported by said grain-removing means.

17. A combine comprising means for harvesting, threshing and separating grain, a grain-holding tank on said combine with a discharge opening and means for delivering grain to said opening for discharge, means for delivering separated grain from said harvesting, threshing and separating means, a casing mounted on the side of said tank and having spaced endwalls and bottom and sidewalls for holding grain, said walls having axially aligned openings with one opening in communication with said tank opening for receiving grain, a discharge pipe with an auger, said pipe fitting into said other opening and said auger extending through said openings and said casing for transporting grain through said casing, a preservative applicator mounted within said casing having spray means for applying a liquid preservative to grain transported through said casing by said auger for protecting grain while in storage against damage.